United States Patent
Lin

(10) Patent No.: US 11,372,799 B2
(45) Date of Patent: Jun. 28, 2022

(54) SERIAL DATA PROCESSING DEVICE AND DATA OFFSET CALIBRATION METHOD

(71) Applicant: REALTEK SEMICONDUCTOR CORPORATION, Hsinchu (TW)

(72) Inventor: Kuo-Chao Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/138,969

(22) Filed: Dec. 31, 2020

(65) Prior Publication Data
US 2021/0224218 A1    Jul. 22, 2021

(30) Foreign Application Priority Data
Jan. 21, 2020   (TW) ................................ 109102229

(51) Int. Cl.
   *G06F 13/42*   (2006.01)
   *G06F 9/54*    (2006.01)
   *G06F 13/40*   (2006.01)
   *G06F 13/38*   (2006.01)

(52) U.S. Cl.
   CPC .......... *G06F 13/4282* (2013.01); *G06F 9/542* (2013.01); *G06F 13/387* (2013.01); *G06F 13/4072* (2013.01)

(58) Field of Classification Search
   CPC .... G06F 13/4282; G06F 9/542; G06F 13/387; G06F 13/4072
   See application file for complete search history.

(56) References Cited

U.S. PATENT DOCUMENTS

| 5,473,610 A | 12/1995 | Rainard | |
|---|---|---|---|
| 2002/0184412 A1* | 12/2002 | Stevens | H04J 3/0608 710/30 |
| 2007/0121767 A1* | 5/2007 | Yamazaki | H04L 25/03885 375/346 |
| 2011/0194651 A1* | 8/2011 | Hayasaka | H04L 7/042 375/340 |
| 2012/0045218 A1* | 2/2012 | Sugawara | H04B 10/58 327/307 |
| 2014/0321579 A1* | 10/2014 | Tell | H04L 25/063 375/317 |
| 2015/0333938 A1* | 11/2015 | Kaviani | H04L 25/03063 375/233 |

OTHER PUBLICATIONS

OA letter of the counterpart TW application (appl. No. 109102229) dated Sep. 24, 2020. Summary of the OA letter: 1. Claims 1-10 are rejected as allegedly being unpatentable over the cited reference 1 (U.S. Pat. No. 5,473,610).

* cited by examiner

*Primary Examiner* — Henry Tsai
*Assistant Examiner* — Harry Z Wang
(74) *Attorney, Agent, or Firm* — WPAT, PC

(57) ABSTRACT

A serial data processing device includes an offset detector circuit and an offset calibration circuit. The offset detector circuit is configured to store a plurality of tokens, and to receive a first data signal from a host device, and to detect an offset in the received first data signal according to the plurality of tokens, in order to generate a calibration signal, in which each of the tokens includes at least one predetermined logic value, and numbers of the at least one predetermined logic value in each of the plurality of tokens are different. The offset calibration circuit is configured to calibrate the received first data signal according to the calibration signal, in order to generate a second data signal.

10 Claims, 5 Drawing Sheets

SERIAL DATA PROCESSING DEVICE AND DATA OFFSET CALIBRATION METHOD

BACKGROUND OF THE INVENTION

1. Field of the Invention

The present disclosure relates to a serial data processing device. More particularly, the present disclosure relates to a serial data processing data able to calibrate data offset(s) and a calibration method thereof.

2. Description of Related Art

A serial communication interface has been widely utilized in a computer bus or in a data channel between integrated circuits. In practical applications (particularly, synchronous transmission applications), the data transmitted via the serial communication interface may suffer from propagation delay, signal reflection, a driving ability of an input/output (I/O) circuit, etc. As a result, an offset is generated in the data received by a receiver end, and thus the receiver end may receive wrong data.

SUMMARY OF THE INVENTION

In some embodiments, a serial data processing device includes an offset detector circuit and an offset calibration circuit. The offset detector circuit is configured to store a plurality of tokens, and to receive a first data signal from a host device, and to detect an offset in the received first data signal according to the plurality of tokens, in order to generate a calibration signal, in which each of the tokens includes at least one predetermined logic value, and numbers of the at least one predetermined logic value in each of the plurality of tokens are different. The offset calibration circuit is configured to calibrate the received first data signal according to the calibration signal, in order to generate a second data signal.

In some embodiments, a data offset calibration method includes the following operations: receiving a first data signal from a host device; detecting an offset in the received first data signal according to a plurality of tokens, in order to generate a calibration signal, in which each of the plurality of tokens includes at least one predetermined logic value, and numbers of the at least one predetermined logic value in each of the plurality of tokens are different; and calibrating the received first data signal according to the calibration signal, in order to generate a second data signal.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
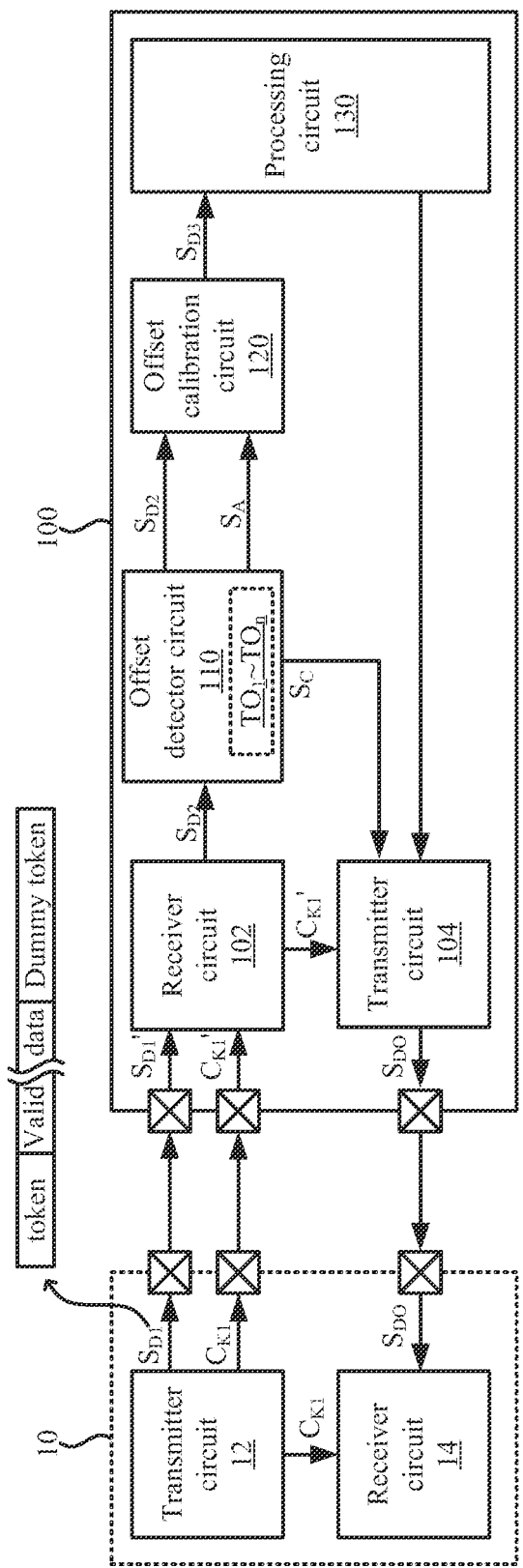
FIG. 1 is a schematic diagram of a serial data processing device according to some embodiments of the present disclosure.

FIG. 1 is a schematic diagram of a serial data processing device 100 according to some embodiments of the present disclosure. In some embodiments, the serial data processing device 100 receives a data signal $S_{D1}$ and a clock signal $C_{K1}$ from a host device 10. In some embodiments, the host device 10 and the serial data processing device 100 may transfer the clock signal $C_{K1}$, the data signal $S_{D1}$, and a data signal SDP to each other via a serial transmission interface. The serial transmission interface may be (but not limited to) a serial peripheral interface.

The host device 10 includes a transmitter circuit 12 and a receiver circuit 14. The serial data processing device 100 includes a receiver circuit 102, a transmitter circuit 104, an offset detector circuit 110, an offset calibration circuit 120, and a processor circuit 130. The transmitter circuit 12 transmits the clock signal $C_{K1}$ to the receiver circuit 102, and transmits the data signal $S_{D1}$ to the receiver circuit 102 according to the clock signal $C_{K1}$. The receiver circuit 102 samples the received data signal $S_{D1}$ (hereinafter referred to as data signal $S_{D1}'$) according to the received clock signal $C_{K1}$ (hereinafter referred to as clock signal $C_{K1}'$), in order to output a data signal $S_{D2}$. In other words, the serial data processing device 100 and the host device 10 operate in a synchronous serial transmission mode.

In some embodiments, the transmitter circuit 104 transmits a data signal $S_{DO}$ according to the clock signal $C_{K1}'$ the receiver circuit 14. The offset detector circuit 110 analyzes the data signal $S_{D2}$ according to tokens $TO_1$-$TO_n$, in order to determine whether an offset exists in the data signal $S_{D1}'$, and to output a calibration signal $S_A$ and the data signal $S_{D2}$ accordingly, in which n may be a positive integer greater than or equal to 1. The offset calibration circuit 120 calibrates the data signal $S_{D2}$ according to the calibration signal $S_A$, in order to calibrate the offset in the data signal $S_{D1}'$ and to generate a data signal $S_{D3}$ accordingly.

The processor circuit 130 receives the data signal $S_{D3}$ from the offset calibration circuit 120 for subsequent data processing. The processor circuit 130 also outputs the data signal $S_{DO}$ to the host device 10 via the transmitter circuit 104. In some embodiments, the processor circuit 130 may be (but not limited to) circuit(s), such as a central processing unit, a microcontroller circuit, etc.

Figure 2A:
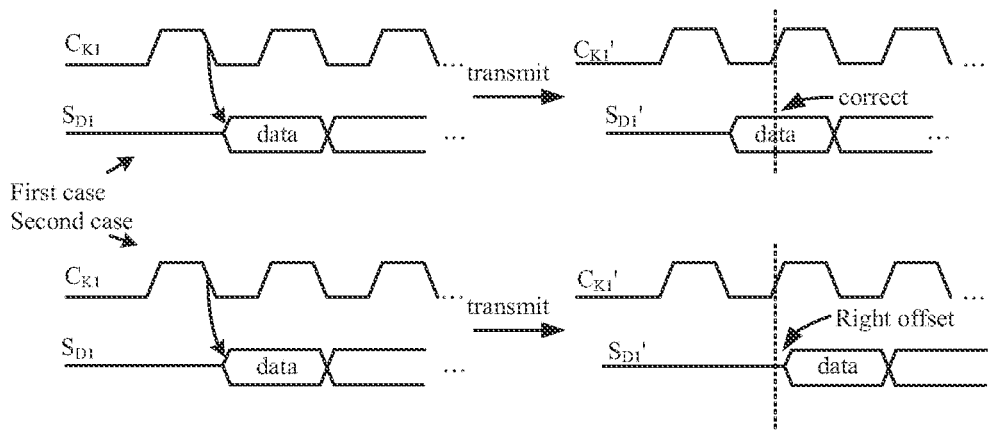
FIG. 2A is a waveform diagram of a case where a right offset exists in the data signal in FIG. 1 according to some embodiments of the present disclosure.

FIG. 2A is a waveform diagram of a case where a right offset exists in the data signal $S_{D1}'$ according to some embodiments of the present disclosure. The receiver circuit 102 receives the clock signal $C_{K1}$ from the transmitter circuit 12 as the clock signal $C_{K1}'$, and the transmitter circuit 12 transmits the data signal $S_{D1}$ to the receiver circuit 102 in response to a negative edge of the clock signal $C_{K1}'$. The receiver circuit 102 samples the data signal $S_{D1}'$ according to a positive edge of the clock signal $C_{K1}'$, in order to generate the data signal $S_{D2}$ (not shown). If impacts from wire delay (e.g., delay introduced from a circuit board) are low (i.e., first case), the positive edge of the clock signal $C_{K1}'$ can be aligned to a valid interval of the data signal $S_{D1}'$ (e.g., a center of an eye diagram). Under this condition, the receiver circuit 102 is able to generate the correct data signal $S_{D2}$.

Alternatively, if the clock signal $C_{K1}$ is too fast (i.e., a second case), the positive edge of the clock signal $C_{K1}'$ is earlier than the valid interval of the data signal $S_{D1}'$. Under this condition, the receiver circuit 102 may generate an inaccurate data signal $S_{D2}$, and the offset detector circuit 110 determines that a right offset exists in the data signal $S_{D1}'$. For example, if the data signal $S_{D1}$ is 00100, the data signal $S_{D2}$ should be 00100. In the examples of the second case, as the receiver circuit 102 samples the data signal $S_{D1}'$ at the premature time, the data signal $S_{D2}$ is mistaken as 00010. Compared with the data signal $S_{D1}$, the right offset exists in the data signal $S_{D1}'$ (or the data signal $S_{D2}$).

Figure 2B:
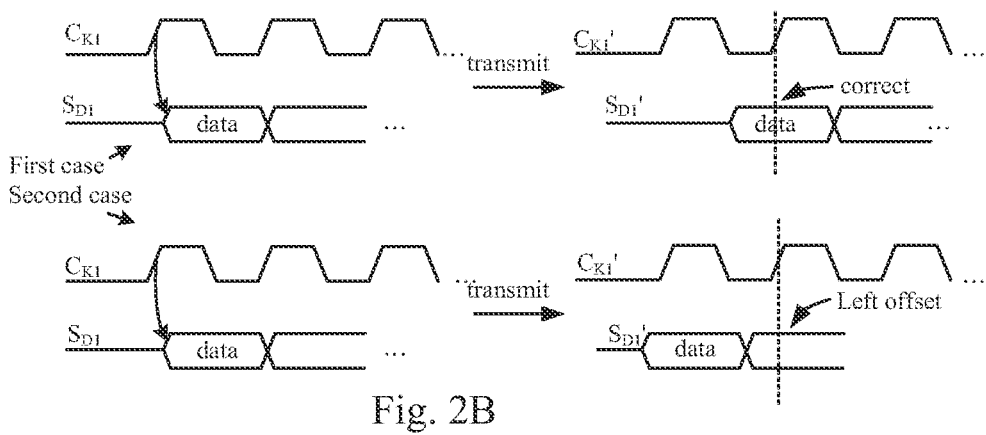
FIG. 2B is a waveform diagram of a case where a left offset exists in the data signal in FIG. 1 according to some embodiments of the present disclosure.

FIG. 2B is a waveform diagram of a case where a left offset exists in the data signal $S_{D1}'$ according to some embodiments of the present disclosure. In this example, the transmitter circuit 12 transmits the data signal $S_{D1}$ to the receiver circuit 102 in response to a positive edge of the clock signal $C_{K1}$. The receiver circuit 102 samples the data signal $S_{D1}'$ according to the positive edge of the clock signal $C_{K1}'$, in order to generate the data signal $S_{D2}$ (not shown). If impacts from wire delay (e.g., delay introduced from a circuit board) are low (i.e., first case), the positive edge of the clock signal $C_{K1}'$ is aligned with the valid interval of the data signal $S_{D1}'$. Under this condition, the receiver circuit 102 is able to generate the correct data signal $S_{D2}$.

Alternatively, if the impacts from circuit delay are too high (i.e., a second case), the positive edge of the clock signal $C_{K1}'$ is later than the valid interval of the data signal $S_{D1}'$. Under this condition, the receiver circuit 102 may generate the incorrect data signal $S_{D2}$, and the offset detector circuit 110 determines that a left offset exists in the data signal $S_{D1}'$. For example, as the receiver circuit 102 samples the data signal $S_{D1}'$ at the delayed time, the data signal $S_{D2}$ is mistaken as 01000. Compared with the data signal $S_{D1}$, the left offset exists in the data signal $S_{D1}'$ (or the data signal $S_{D2}$).

With continued reference to FIG. 1, in some embodiments, the offset detector circuit 110 may include a register (not shown) configured to store the tokens $TO_1$-$TO_n$. For example, the tokens $TO_1$-$TO_n$ may be stored in the register as the following table:

| | |
|---|---|
| $TO_1$ | 00010000 |
| $TO_2$ | 00011000 |
| $TO_3$ | 00111000 |
| $TO_4$ | 00111100 |
| $TO_5$ | 01111100 |
| $TO_6$ | 01111110 |

In this example, n is set to be 6, and each token $TO_1$-$TO_n$ is set to have 8 bits, in which a right most bit is a zeroth bit, and a left most bit is a seventh bit. In some embodiments, each token includes at least one predetermined logic value (e.g., a logic value of 1), and numbers of the at least one predetermined logic value in each token $TO_1$-$TO_6$ are different. In this example, numbers of the logic value of 1 in each token $TO_1$-$TO_6$ are sequentially increased. In greater detail, a fifth bit of the token $TO_1$ is the logic value of 1 (i.e., the number of the logic value of 1 is 1), the fourth to the fifth bits of the token $TO_2$ are logic values of 1 (i.e., the number of the logic value of 1 is 2), and the fourth to the sixth bits of the token $TO_3$ are logic values of 1 (i.e., the number of the logic values of 1 is 3). With this analogy, the configuration of bits in the token $TO_6$ can be understood.

As shown in FIG. 1, the data signal $S_{D1}$ includes the token, payload, and a dummy token. The token is a specific code that is determined by the host device 10 and the serial data processing device 100 in advance, and is set to be front data of the data signal $S_{D1}$. The payload is true data to be transmitted by the host device 10. The dummy token is a buffering token data when the right offset exists.

During an initial phase of the connection, the host device 10 and the serial data processing device 100 may utilize one of tokens $TO_1$-$TO_6$ which is determined in advance to initiate the connection, in order to detect whether an offset exists in the subsequent transmission. In the token of the data signal $S_{D1}$, the number of the at least one predetermined logic value is a first number. In the corresponding of the tokens $TO_1$-$TO_6$, the number of the at least one predetermined logic value is a second number, and the first number is the same as the second number.

For example, the host device 10 utilizes the data signal $S_{D1}$ including the token $TO_1$ to connect with the serial data processing device 100. The offset detector circuit 110 compares front 8-bit data of the data signal $S_{D2}$ with the corresponding one of the tokens $TO_1$-$TO_6$, in order to detect whether the offset is a left offset or a right offset. If the offset does not exist, the front 8-bit data of the data signal $S_{D2}$ will be the same as the token $TO_1$ of the data signal $S_{D1}$. The offset detector circuit 110 may determine whether the offset is the left offset or the right offset according to bit location(s) of the at least one predetermined logic value (e.g., the logic value of 1) in the corresponding one of the tokens $TO_1$-$TO_n$ and those in the front 8-bit data of the data signal Sm.

For example, if the front 8-bit data of the data signal $S_{D2}$ (i.e., the sampled data signal $S_{D1}'$) is 00001000 (i.e., the first number is 1), the offset detector circuit 110 selects the token $TO_1$ that only includes one logic value of 1 (i.e., the second number is 1) from the tokens $TO_1$-$TO_n$, and compares the front 8-bit data of 00001000 with the token 1 $TO_1$. In the token $TO_1$, the fifth bit is the logic value of 1. In the 8-bit data of 00001000, the fourth bit is the logic value of 1. Under this condition, the offset detector circuit 110 determines that the right offset exists in the data signal So1', and that the offset amount is one bit. The offset detector circuit 110 thus outputs the calibration signal $S_A$ having a first value to the offset calibration circuit 120.

Alternatively, if the front 8-bit data of the data signal $S_{D2}$ is 00100000, the offset detector circuit 110 selects the token $TO_1$ that only has one logic value of 1 from the tokens $TO_1$-$TO_n$, and compares the 8-bit data of 00100000 with the token $TO_1$. In the token $TO_1$, the fifth bit is the logic value of 1. In the 8-bit data of 00100000, the sixth bit is the logic value of 1. Under this condition, the offset detector circuit 110 determines that the left offset exists in the data signal $S_{D1}'$, and that the offset amount is one bit. The offset detector circuit 110 thus outputs the calibration signal $S_A$ having a second value to the offset calibration circuit 120.

In response to the calibration signal $S_A$, the offset calibration circuit 120 calibrates the offset in the data signal $S_{D2}$, in order to generate the data signal $S_{D3}$. For example, if the right offset is detected and the offset amount is one bit, the offset calibration circuit 120 moves bits in the received data signal $S_{D2}$ to left by one bit, in order to output the data signal $S_{D3}$. As a result, the processor circuit 130 is able to receive the correct valid data.

In some embodiments, the offset detector circuit 110 may include a register circuit, a comparator circuit (which may be, for example, an exclusive OR gate circuit), a counter circuit, and/or other digital logic circuit(s), in order to store these tokens $TO_1$-$TO_n$ and to detect the data offset. In some embodiments, the offset calibration circuit 120 may include a register and/or one or more digital logic circuits, in order to calibrate the offset. In some embodiments, the digital logic circuit(s) in the offset calibration circuit 120 may be (but not limited to) configured to perform a bitwise operation, in order to shift the bits. The implementations of the offset detector circuit 110 and the offset calibration circuit 120 are given for illustrative purposes, and the present disclosure is not limited thereto.

Figure 3:
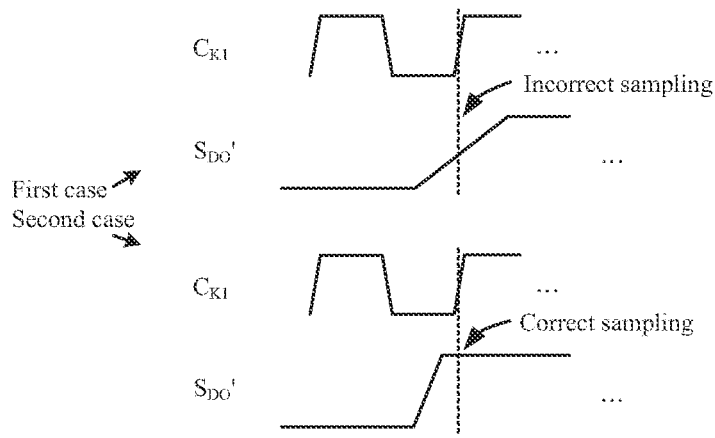
FIG. 3 is a waveform diagram of the data signal in FIG. 1 according to some embodiments of the present disclosure.

FIG. 3 is a waveform diagram of the data signal $S_{DO}$ in FIG. 1 according to some embodiments of the present disclosure. As described above, if the right offset is detected, it indicates that the clock signal $C_{K1}$ may be too fast. As shown in FIG. 1, the receiver circuit 14 samples the received data signal $S_{DO}$ (hereinafter referred to as a data signal $S_{DO}'$) according to the clock signal $C_{K1}$. As shown in FIG. 3, if the frequency of the clock signal $C_{K1}$ is too high and if the receiver circuit 14 samples the data signal $S_{DO}'$ according to the positive edge of the clock signal $C_{K1}$ (i.e., first case), the positive edge of the clock signal $C_{K1}$ is earlier than the valid interval of the data signal $S_{DO}'$, and thus incorrect data is sampled.

In some embodiments, when the offset detector circuit 110 detects that the right offset exists in the data signal $S_{D1}'$, the offset detector circuit 110 is further configured to output a control signal $S_C$ to the transmitter circuit 104, in order to increase a driving ability of the transmitter circuit 104 (i.e., the second case in FIG. 3). For example, the transmitter circuit 104 increases the current of the data signal $S_{DO}$ according to the control signal $S_C$. As a result, the positive edge of the clock signal $C_{K1}$ aligns with the valid interval of the data signal $S_{DO}'$, and thus correct data is sampled. In some embodiments, the bias setting and/or the load setting of the transmitter circuit 104 can be adjusted in response to the control signal $S_C$, in order to adjust the driving ability.

Figure 4:
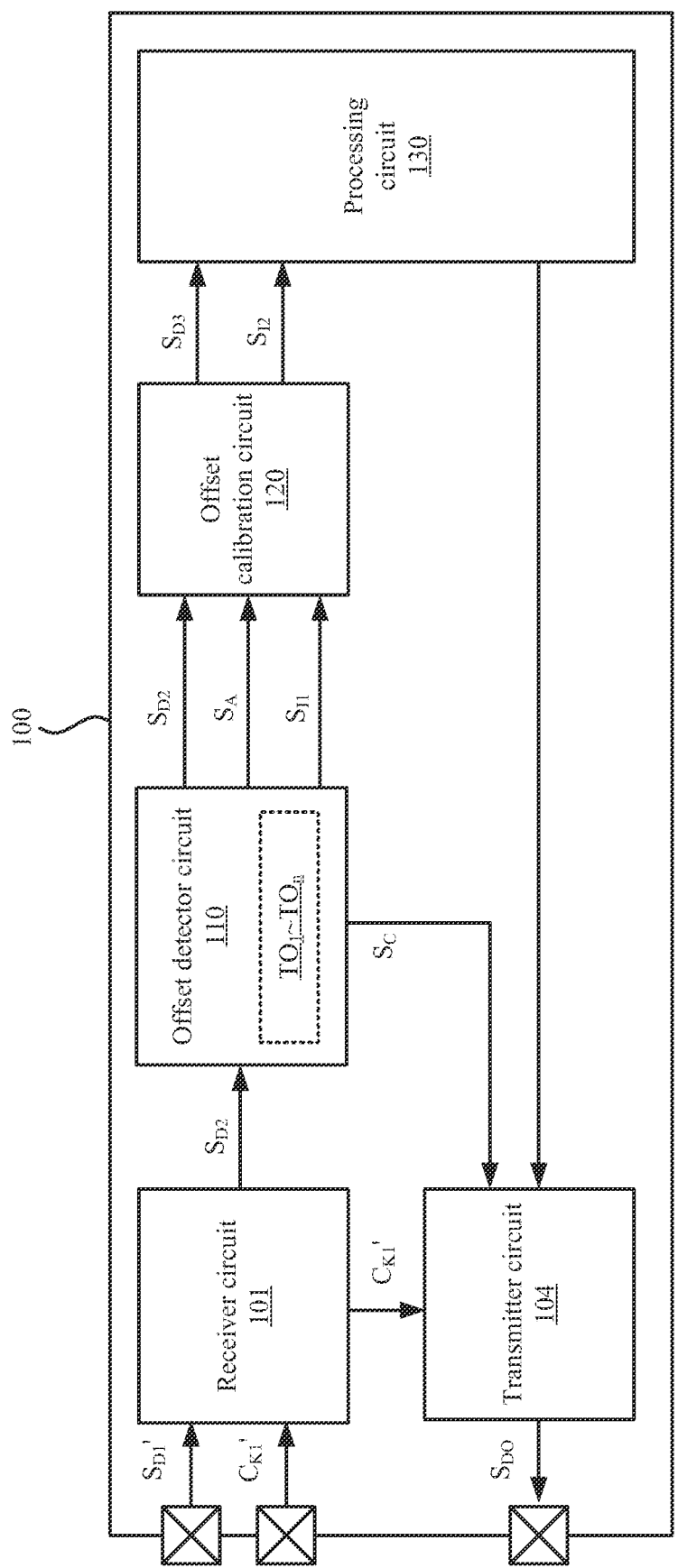
FIG. 4 is a schematic diagram of the serial data processing device according to some embodiments of the present disclosure.

FIG. 4 is a schematic diagram of the serial data processing device 100 according to some embodiments of the present disclosure. Compared with FIG. 1, as shown in the following table, each of the tokens $TO_1$-$TO_n$ corresponds to a predetermined command In other words, an operation code corresponding to the predetermined command is embedded in each of tokens $TO_1$-$TO_n$. With such arrangement, when transmitting the token for detecting offset, the host device 10 is able to provide the command to be executed by the serial data processing device 100.

|  |  | Predetermined command |
| --- | --- | --- |
| $TO_1$ | 00010000 | Memory read |
| $TO_2$ | 00011000 | Input/output (I/O) read |
| $TO_3$ | 00111000 | Register read |
| $TO_4$ | 00111100 | Memory write |
| $TO_5$ | 01111100 | I/O write |
| $TO_6$ | 01111110 | Register write |

In this example, the offset detector circuit 110 further generates a command signal $S_{f1}$ according to the command corresponding to the token of the data signal $S_{D1}'$. For example, the offset detector circuit 110 decodes the operation code to generate the command signal $S_{f1}$ according to the front 8-bit data of the data signal $S_{D1}'$. The offset calibration circuit 120 further calibrates the command signal $S_{f1}$ according to the calibration signal $S_A$ to generate a command signal $S_E$. The command signal $S_{f2}$ is to notify the processor circuit 130 to execute operations of the predetermined command. The offset detector circuit 110 is able to select one token from the above table according to a number of at least one predetermine value in the front 8-bit data of the data signal $S_{D1}'$, and to generate the command signal $S_{f1}$ according to the predetermined command corresponding to the token. For example, if the front 8-bit data of the data signal $S_{D1}'$ include one logic value of 1, the offset detector circuit 110 selects the token $TO_1$, and outputs the corresponding memory read command as the command signal Sn. The offset calibration circuit 120 calibrates the command signal Sn according to the calibration signal $S_A$, in order to generate the correct command signal $S_{f2}$. As a result, the processor circuit 130 is able to perform the operations of reading memory according to the command signal $S_{f2}$.

Figure 5A:
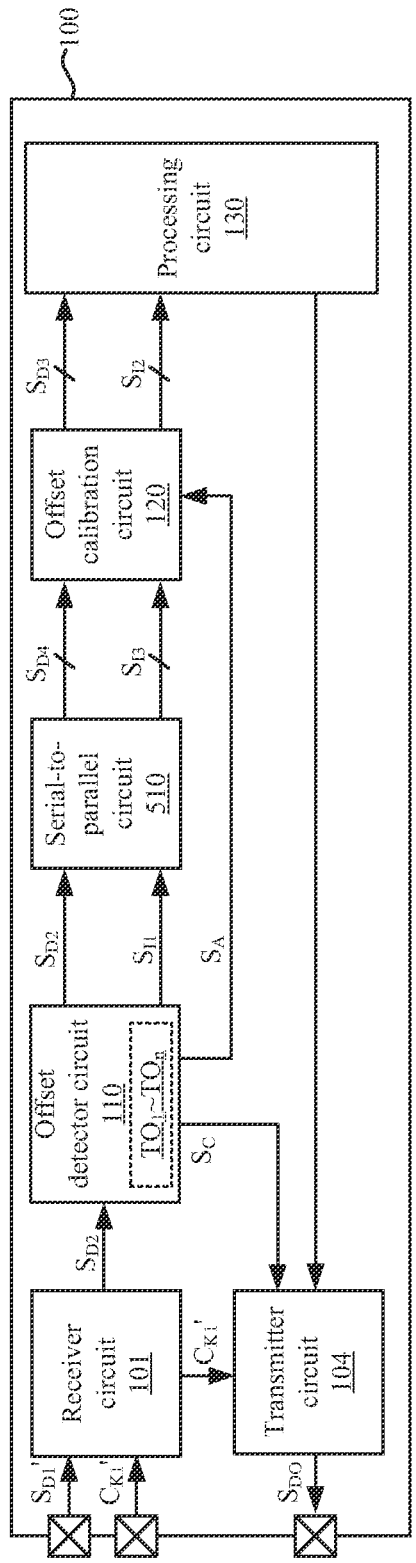
FIG. 5A is a schematic diagram of the serial data processing device according to some embodiments of the present disclosure.

In some applications, the processor circuit 130 is parallel computing. In these applications, the serial data processing device 100 may be set to output parallel data. FIG. 5A is a schematic diagram of the serial data processing device 100 according to some embodiments of the present disclosure. In this example, the serial data processing device 100 further includes a serial-to-parallel circuit 510. The serial-to-parallel circuit 510 is coupled between the offset detector circuit 110 and the offset calibration circuit 120, and is configured to generate data signals $S_{D4}$ according to the data signal $S_{D1}'$, and is configured to generate command signals $S_{f3}$ according to the command signal $S_{f1}$. The offset calibration circuit 120 calibrates the data signals $S_{D4}$ according to the calibration signal $S_A$ to generate the data signals $S_{D3}$, and calibrates the command signals $S_{f3}$ to generate the command signals $S_{f2}$.

Figure 5B:
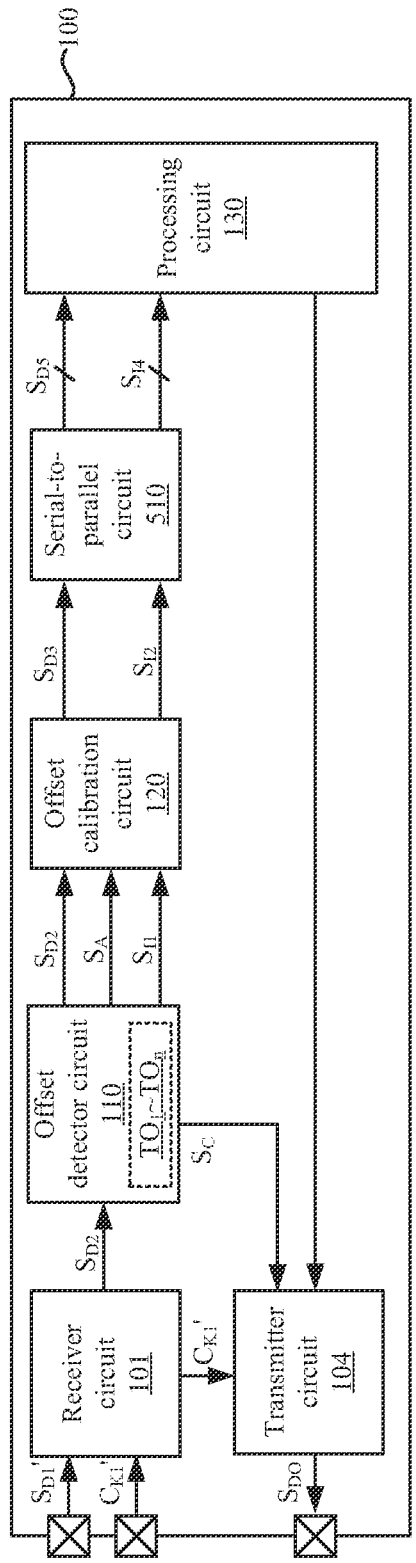
FIG. 5B is a schematic diagram of the serial data processing device according to some embodiments of the present disclosure.

FIG. 5B is a schematic diagram of the serial data processing device 100 according to some embodiments of the present disclosure. Compared with FIG. 5A, the serial-toparallel circuit 510 is coupled between the offset calibration circuit 120 and the processor circuit 130. The serial-to-parallel circuit 510 generates data signals $S_{D5}$ according to the data signal $S_{D3}$, and generates the command signals $S_{I4}$ according to the command signal $S_{I2}$.

Figure 6:
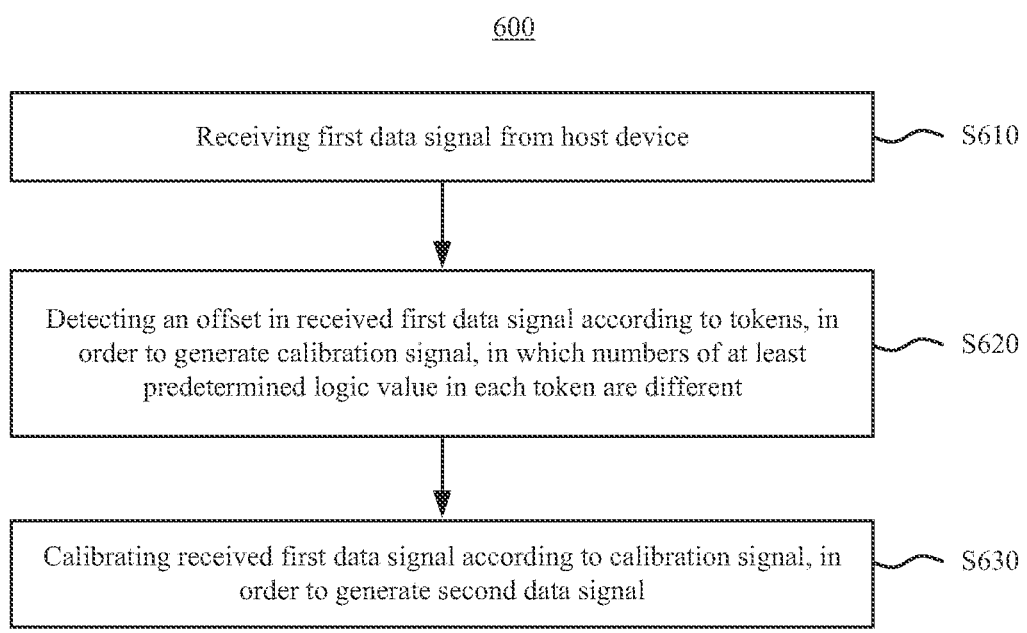
FIG. 6 is a flowchart of a data offset calibration method according to some embodiments of the present disclosure.

FIG. 6 is a flowchart of a data offset calibration method 600 according to some embodiments of the present disclosure. In some embodiments, the data offset calibration method 600 may be (but not limited to) performed by the serial data processing device 100.

In operation S610, a first data signal is received from a host device.

In operation S620, an offset in the received first data signal is detected according to tokens, in order to generate a calibration signal, in which each token include at least one predetermined logic value, and numbers of the at least one predetermined logic value in each token are different.

In operation S630, the first data signal is calibrated according to the calibration signal, in order to generate a second data signal.

Operations S610, S620, and S630 can be understood with reference to the above embodiments, and thus the repetitious descriptions are not further given. The above description of the data offset calibration method 600 includes exemplary operations, but the operations of the data offset calibration method 600 are not necessarily performed in the order described above. The order of the operations of the data offset calibration method 600 can be changed, or the operations can be executed simultaneously or partially simultaneously as appropriate, in accordance with the spirit and scope of various embodiments of the present disclosure.

The arrangement and the bit number of the tokens shown above are given for illustrative purposes, and various embodiments of the present disclosure are not limited thereto.

As described above, the serial data processing device and the data offset calibration method are able to calibrate data offset(s) according to predetermined tokens. In some further embodiments, these tokens are further configured to transmit predetermined commands.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A serial data processing device, comprising:
   an offset detector circuit configured to store a plurality of tokens, and to receive a first data signal from a host device, and to detect an offset in the received first data signal according to the plurality of tokens, in order to generate a calibration signal, wherein each of the tokens comprises at least one predetermined logic value, and numbers of the at least one predetermined logic value in each of the plurality of tokens are different;
   an offset calibration circuit configured to calibrate the received first data signal according to the calibration signal, in order to generate a second data signal; and
   a transmitter circuit configured to transmit a third data signal to the host device,
   wherein the offset detector circuit is further configured to output a control signal to the transmitter circuit when the offset is determined to be a right offset, in order to increase a driving ability of the transmitter circuit.

2. The serial data processing device of claim 1, wherein the offset detector circuit is configured to compare the first data signal with a first token in the plurality of tokens, in order to detect the offset in the received first data signal.

3. The serial data processing device of claim 2, wherein the first data signal comprises front data, the offset detector circuit is configured to select the first token from the plurality of tokens according to a number of the at least one predetermined logic value in the front data, and a number of the at least one predetermined logic value in the first token is the same as the number of the at least one predetermined logic value in the front data.

4. The serial data processing device of claim 2, wherein the offset detector circuit is configured to determine whether the offset is a left offset or the right offset according to a bit location of the at least predetermined logic value in the first token and a bit location of the at least one predetermined logic value in the received first data signal, in order to generate the calibration signal.

5. The serial data processing device of claim 2, wherein each of the plurality of tokens corresponds to a predetermined command, the offset detector circuit is configured to output a first command signal according to the predetermined command corresponding to the first token, and the offset calibration circuit is further configured to calibrate the first command signal according to the calibration signal, in order to generate a second command signal, wherein the second command signal is to notify a processing circuit to perform at least one operation corresponding to the predetermined command.

6. The serial data processing device of claim 1, further comprising:
   a serial-to-parallel circuit configured to generate a plurality of fourth data signals according to the received first data signal, wherein the offset calibration circuit is configured to calibrate the plurality of fourth data signals according to the calibration signal, in order to generate the second data signal.

7. The serial data processing device of claim 1, further comprising:
   a serial-to-parallel circuit configured to generate a plurality of fourth data signals according to the second data signal.

8. A data offset calibration method, comprising:
   receiving a first data signal from a host device;
   detecting an offset in the received first data signal according to a plurality of tokens, in order to generate a calibration signal, wherein each of the plurality of tokens comprises at least one predetermined logic value, and numbers of the at least one predetermined logic value in each of the plurality of tokens are different;

calibrating the received first data signal according to the calibration signal, in order to generate a second data signal; and increasing a driving ability of a transmitter circuit when the offset is determined to be a right offset, wherein the transmitter circuit is configured to transmit a third data signal to the host device.

9. The data offset calibration method of claim 8, wherein detecting the offset in the received first data signal according to the plurality of tokens to generate the calibration signal comprises:

selecting a first token from the plurality of tokens according to the received first data signal; and determining whether the offset is a left offset or the right offset according to a bit location of the at least predetermined logic value in the first token and a bit location of the at least one predetermined logic value in the received first data signal, in order to generate the calibration signal.

10. The data offset calibration method of claim 9, wherein each of the plurality of tokens corresponds to a predetermined command, and the data offset calibration method further comprises:

outputting a first command signal according to the predetermined command corresponding to the first token; and calibrating the first command signal according to the calibration signal, in order to generate a second command signal, wherein the second command signal is to notify a processing circuit to perform at least one operation corresponding to the predetermined command.

* * * * *